9403X
W. Cary,
Band Saw Mill.
Patented Feb. 17, 1836.
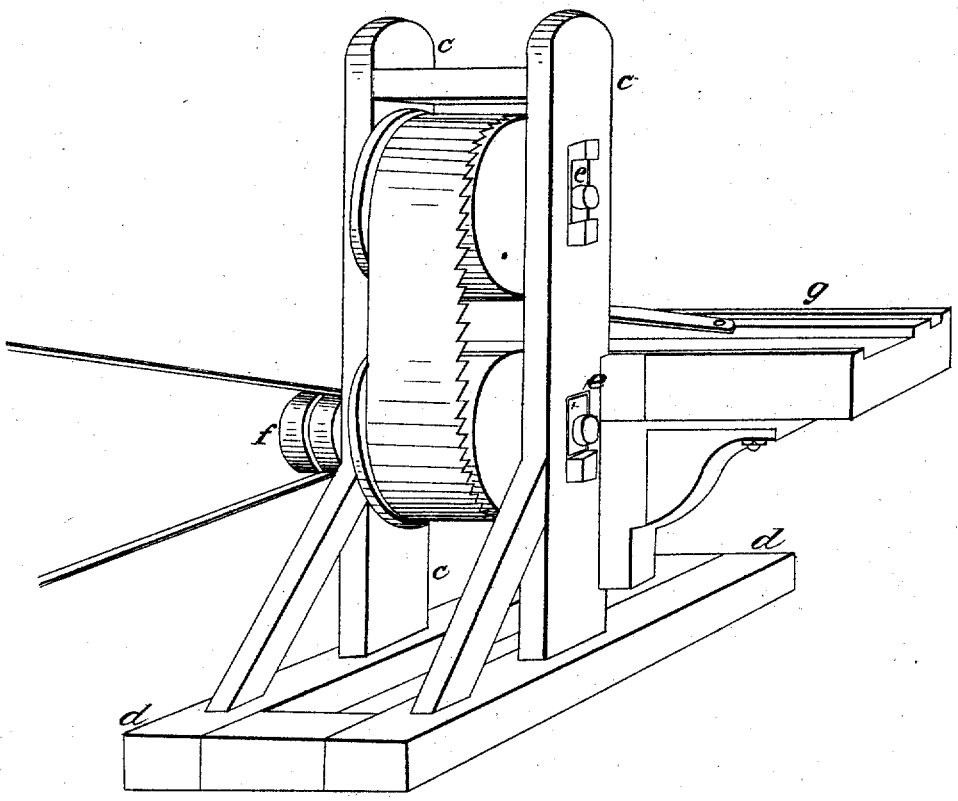
AM. PHOTO-LITHO. CO. N.Y. (OSBORNE'S PROCESS)

William Cary, of Poughkeepsie New York

Letters Patent.

The schedule referred to in these Letters Patent, and making
part of the same containing a description in the words of the
said William Cary, himself of his Improvement, in the Belt Saw
To all To whom these presents shall come,
Be it known that I W^m Cary of the Town of Poughkeepsie in
the County of Dutches, and State of New York, have invented a
new and useful method of sawing with a band saw, and the following
is a full and exact description thereof and method of using it, the
band saw will be made as other saws. to the length, width &
thickness - required, then brazed or welded at the ends to
form a hoop, this saw will be strained on two wheels of wood
or iron of equal diameter, and to run vertically one over the
other, the saw will then form two semicircles, and two straight
lines, the wheels will have a flanch on one side, to project their
circumference, to guard the saw from running off. and keep it
to the work, the wheels when made of Iron, should be covered with
wood or leather for the saw to run upon, the space between
the wheels will be regulated by the thickness of the material
to be sawed and the thickness of the saw will give the diame
-ter of the wheels, one the thickness of a billet web or wood
cutters saw will run on wheels of thirty inches diameter, one
the thickness of a pannel saw on wheels of three feet, and one
the thickness of a carpenters ripper on wheels of four feet in
diameter and so in proportion, the frame in which these
wheels are to operate, will be formed with two posts framed
~~framed~~ into two sills, and braced from them, with two rails
from sill to sill, and one from post to post at the top. the
length of the axles will give the length of the rails, and the and the axles will be as long as the wheels diameter, the boxes of the lower axle will be fixed in the post, and the axle raised up to it with wedges the upper boxes to be moved up and down in the posts by wedges to strain the saw, and balance it that it may not press too hard against the [illegible] nor run off on the other side, a wheel to be fixed on the lower axle on which to apply the power to drive the Machine with a loose wheel to recieve the belt when cast off, there will be a platform fixed between the wheels, on which to lay the material to be sawed, supported from the posts, from this platform will be a transversal to turn on a centre with which to saw circles, and a guide to shift by which to saw in a straight line to any width or thickness, and irregular shapes may be guided by the hand,

What I claim as my own invention and not previously known in the above described Machine, is the band saw running on two wheels, and the arrangement of the Machine in which it is to operate, In testimony whereof I have hereunto set my hand

Witnesses
A Raymond
Jarvis W. Freeman

William Cary

576 [illegible]

[illegible] LJW.

[illegible]